United States Patent
Talib et al.

(10) Patent No.: US 11,275,853 B2
(45) Date of Patent: *Mar. 15, 2022

(54) CONVERSATION PRINT SYSTEM AND METHOD

(71) Applicant: Nuance Communications, Inc., Burlington, MA (US)

(72) Inventors: Haydar Talib, Montreal (CA); Peter Stubley, Beaconsfield (CA)

(73) Assignee: NUANCE COMMUNICATIONS, INC., Burlington, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/038,777

(22) Filed: Jul. 18, 2018

(65) Prior Publication Data

US 2019/0237080 A1 Aug. 1, 2019

Related U.S. Application Data

(60) Provisional application No. 62/624,988, filed on Feb. 1, 2018.

(51) Int. Cl.
| | |
|---|---|
| *G06F 21/32* | (2013.01) |
| *G10L 15/18* | (2013.01) |
| *G06F 21/60* | (2013.01) |
| *G10L 17/06* | (2013.01) |
| *G10L 15/32* | (2013.01) |

(Continued)

(52) U.S. Cl.
CPC ............ *G06F 21/608* (2013.01); *G06F 21/32* (2013.01); *G06Q 50/265* (2013.01); *G10L 15/1807* (2013.01); *G10L 15/26* (2013.01); *G10L 15/32* (2013.01); *G10L 17/00* (2013.01); *G10L 17/06* (2013.01); *H04M 3/2218* (2013.01); *H04M 3/2281* (2013.01); *H04M 3/42221* (2013.01); *G06F 2221/2115* (2013.01); *H04M 2203/6027* (2013.01)

(58) Field of Classification Search
CPC ............ H04M 2203/6027; G06F 21/32; G10L 15/1807

See application file for complete search history.

(56) References Cited

U.S. PATENT DOCUMENTS

| | | | |
|---|---|---|---|
| 7,762,264 B1 * | 7/2010 | Ramig | G16H 20/30 128/898 |
| 8,831,941 B2 | 9/2014 | Gilbert et al. | |

(Continued)

OTHER PUBLICATIONS

International Search Report issued in PCT Application Serial No. PCT/US2019/016054 dated Apr. 25, 2019.

(Continued)

*Primary Examiner* — Bryan S Blankenagel (74) *Attorney, Agent, or Firm* — Brian J. Colandreo; Michael T. Abramson; Holland & Knight LLP (57) ABSTRACT

Conversation Print: A method, computer program product, and computing system for receiving voice-based content from a third-party. The voice-based content is processed to define a text-based transcript for the voice-based content. The voice-based content is processed to define speech-pattern indicia for the voice-based content. A conversation print for the voice-based content is generated based, at least in part, upon the text-based transcript and the speech-pattern indicia.

12 Claims, 4 Drawing Sheets

(51) Int. Cl.
*G10L 15/26* (2006.01)
*G10L 17/00* (2013.01)
*G06Q 50/26* (2012.01)
*H04M 3/22* (2006.01)
*H04M 3/42* (2006.01)

(56) References Cited

U.S. PATENT DOCUMENTS

| | | | |
|---|---|---|---|
| 9,641,680 B1* | 5/2017 | Wold | G06F 16/337 |
| 10,529,338 B2 | 1/2020 | Aley-Raz et al. | |
| 2001/0003039 A1* | 6/2001 | Marshall | G09B 1/02 |
| | | | 434/167 |
| 2005/0063522 A1 | 3/2005 | Kim et al. | |
| 2006/0111904 A1* | 5/2006 | Wasserblat | G10L 17/00 |
| | | | 704/246 |
| 2006/0285665 A1 | 12/2006 | Wasserblat et al. | |
| 2007/0071206 A1* | 3/2007 | Gainsboro | G10L 25/63 |
| | | | 379/168 |
| 2010/0228580 A1 | 9/2010 | Zoldi et al. | |
| 2010/0228656 A1* | 9/2010 | Wasserblat | G06Q 10/10 |
| | | | 705/35 |
| 2010/0303211 A1 | 12/2010 | Martig et al. | |
| 2012/0072453 A1 | 3/2012 | Guerra et al. | |
| 2012/0253805 A1 | 10/2012 | Rajakumar et al. | |
| 2012/0263285 A1 | 10/2012 | Rajakumar et al. | |
| 2013/0216029 A1* | 8/2013 | Pawlewski | H04M 3/2281 |
| | | | 379/88.01 |
| 2014/0088961 A1* | 3/2014 | Woodward | G10L 15/22 |
| | | | 704/235 |
| 2014/0247926 A1 | 9/2014 | Gainsboro et al. | |
| 2014/0249817 A1* | 9/2014 | Hart | G10L 15/22 |
| | | | 704/239 |
| 2014/0356822 A1* | 12/2014 | Hoque | G09B 7/00 |
| | | | 434/185 |
| 2015/0112682 A1 | 4/2015 | Rodriguez et al. | |
| 2016/0098705 A1* | 4/2016 | Kurapati | G06Q 20/40 |
| | | | 705/41 |
| 2016/0142534 A1 | 5/2016 | Guerra et al. | |
| 2016/0371477 A1* | 12/2016 | Boss | G06F 21/32 |
| 2017/0084295 A1* | 3/2017 | Tsiartas | G10L 17/02 |
| 2017/0358296 A1* | 12/2017 | Segalis | G10L 15/1807 |
| 2018/0075845 A1* | 3/2018 | Kochura | G10L 25/48 |
| 2018/0097841 A1* | 4/2018 | Stolarz | H04L 67/306 |
| 2018/0205726 A1* | 7/2018 | Chari | G10L 17/02 |
| 2018/0218731 A1* | 8/2018 | Gustafson | G10L 15/26 |
| 2018/0277017 A1* | 9/2018 | Cheung | G09B 19/04 |
| 2018/0295238 A1* | 10/2018 | Hardy | H04L 63/1408 |
| 2018/0357645 A1* | 12/2018 | Caution | G06Q 20/40145 |
| 2019/0037081 A1* | 1/2019 | Rao | H04M 7/0078 |
| 2019/0057472 A1* | 2/2019 | Ross | G09B 7/07 |
| 2019/0207975 A1* | 7/2019 | Wardman | H04L 63/145 |

OTHER PUBLICATIONS

Non-Final Office Action issued in U.S. Appl. No. 16/038,842 dated Sep. 27, 2019.
Non-Final Office Action issued in U.S. Appl. No. 16/038,886 dated Sep. 30, 2019.
Final Office Action issued in U.S. Appl. No. 16/038,886 dated Jan. 23, 2020.
Final Office Action issued in U.S. Appl. No. 16/038,842 dated Jan. 23, 2020.
Non-Final Office Action issued in related U.S. Appl. No. 16/038,842 dated Jul. 13, 2020.
Non-Final Office Action issued in related U.S. Appl. No. 16/038,886 dated Jul. 13, 2020.
Final Office Action issued in related U.S. Appl. No. 16/038,886 dated Nov. 4, 2020.
Final Office Action issued in related U.S. Appl. No. 16/038,842 dated Nov. 4, 2020.
Non-Final Office Action issued in related U.S. Appl. No. 16/038,842 dated Apr. 19, 2021.
Non-Final Office Action issued in related U.S. Appl. No. 16/038,886 dated Apr. 19, 2021.
Final Office Action issued in related U.S. Appl. No. 16/038,842 dated Aug. 13, 2021.
Final Office Action issued in related U.S. Appl. No. 16/038,886 dated Aug. 13, 2021.
Notice of Allowance issued in U.S. Appl. No. 16/038,842 dated Nov. 3, 2021.
Notice of Allowance issued in U.S. Appl. No. 16/038,886 dated Nov. 4, 2021.

* cited by examiner

CONVERSATION PRINT SYSTEM AND METHOD

RELATED APPLICATION(S)

This application claims the benefit of U.S. Provisional Application No. 62/624,988, filed on 1 Feb. 2018, the entire contents of which are incorporated herein by reference.

TECHNICAL FIELD

This disclosure relates to conversation prints and, more particularly, to systems and methods that utilize conversation prints to detect fraudsters.

BACKGROUND

In many interactions between people (e.g., a customer calling a business and the customer service representative that handles the call), fraudsters often impersonate legitimate customers in an attempt to commit an act of fraud. For example, a fraudster my reach out to a credit card company and pretend to be a customer of the credit card company so that they may fraudulently obtain a copy to that customer's credit card. Unfortunately, these fraudsters are often successful, resulting in fraudulent charges, fraudulent monetary transfers, and identity theft. For obvious reasons, it is desirable to identify these fraudsters and prevent them from being successful.

SUMMARY OF DISCLOSURE

Conversation Print

In one implementation, a computer-implemented method is executed on a computing device and includes receiving voice-based content from a third-party. The voice-based content is processed to define a text-based transcript for the voice-based content. The voice-based content is processed to define speech-pattern indicia for the voice-based content. A conversation print for the voice-based content is generated based, at least in part, upon the text-based transcript and the speech-pattern indicia.

One or more of the following features may be included. Processing the voice-based content to define speech-pattern indicia for the voice-based content may include processing the voice-based content to define one or more inflection patterns defined within the voice-based content. Processing the voice-based content to define speech-pattern indicia for the voice-based content may include processing the voice-based content to define one or more accent patterns defined within the voice-based content. Processing the voice-based content to define speech-pattern indicia for the voice-based content may include processing the voice-based content to define one or more pause patterns defined within the voice-based content. Processing the voice-based content to define speech-pattern indicia for the voice-based content may include processing the voice-based content to define one or more word choice patterns defined within the voice-based content. The voice-based content from a third-party may include a portion of a telephone conversation between the third party and a customer service representative. The conversation print may be configured to define a conversation pattern for the third party.

In another implementation, a computer program product resides on a computer readable medium and has a plurality of instructions stored on it. When executed by a processor, the instructions cause the processor to perform operations including receiving voice-based content from a third-party. The voice-based content is processed to define a text-based transcript for the voice-based content. The voice-based content is processed to define speech-pattern indicia for the voice-based content. A conversation print for the voice-based content is generated based, at least in part, upon the text-based transcript and the speech-pattern indicia.

One or more of the following features may be included. Processing the voice-based content to define speech-pattern indicia for the voice-based content may include processing the voice-based content to define one or more inflection patterns defined within the voice-based content. Processing the voice-based content to define speech-pattern indicia for the voice-based content may include processing the voice-based content to define one or more accent patterns defined within the voice-based content. Processing the voice-based content to define speech-pattern indicia for the voice-based content may include processing the voice-based content to define one or more pause patterns defined within the voice-based content. Processing the voice-based content to define speech-pattern indicia for the voice-based content may include processing the voice-based content to define one or more word choice patterns defined within the voice-based content. The voice-based content from a third-party may include a portion of a telephone conversation between the third party and a customer service representative. The conversation print may be configured to define a conversation pattern for the third party.

In another implementation, a computing system includes a processor and memory is configured to perform operations including receiving voice-based content from a third-party. The voice-based content is processed to define a text-based transcript for the voice-based content. The voice-based content is processed to define speech-pattern indicia for the voice-based content. A conversation print for the voice-based content is generated based, at least in part, upon the text-based transcript and the speech-pattern indicia.

One or more of the following features may be included. Processing the voice-based content to define speech-pattern indicia for the voice-based content may include processing the voice-based content to define one or more inflection patterns defined within the voice-based content. Processing the voice-based content to define speech-pattern indicia for the voice-based content may include processing the voice-based content to define one or more accent patterns defined within the voice-based content. Processing the voice-based content to define speech-pattern indicia for the voice-based content may include processing the voice-based content to define one or more pause patterns defined within the voice-based content. Processing the voice-based content to define speech-pattern indicia for the voice-based content may include processing the voice-based content to define one or more word choice patterns defined within the voice-based content. The voice-based content from a third-party may include a portion of a telephone conversation between the third party and a customer service representative. The conversation print may be configured to define a conversation pattern for the third party.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
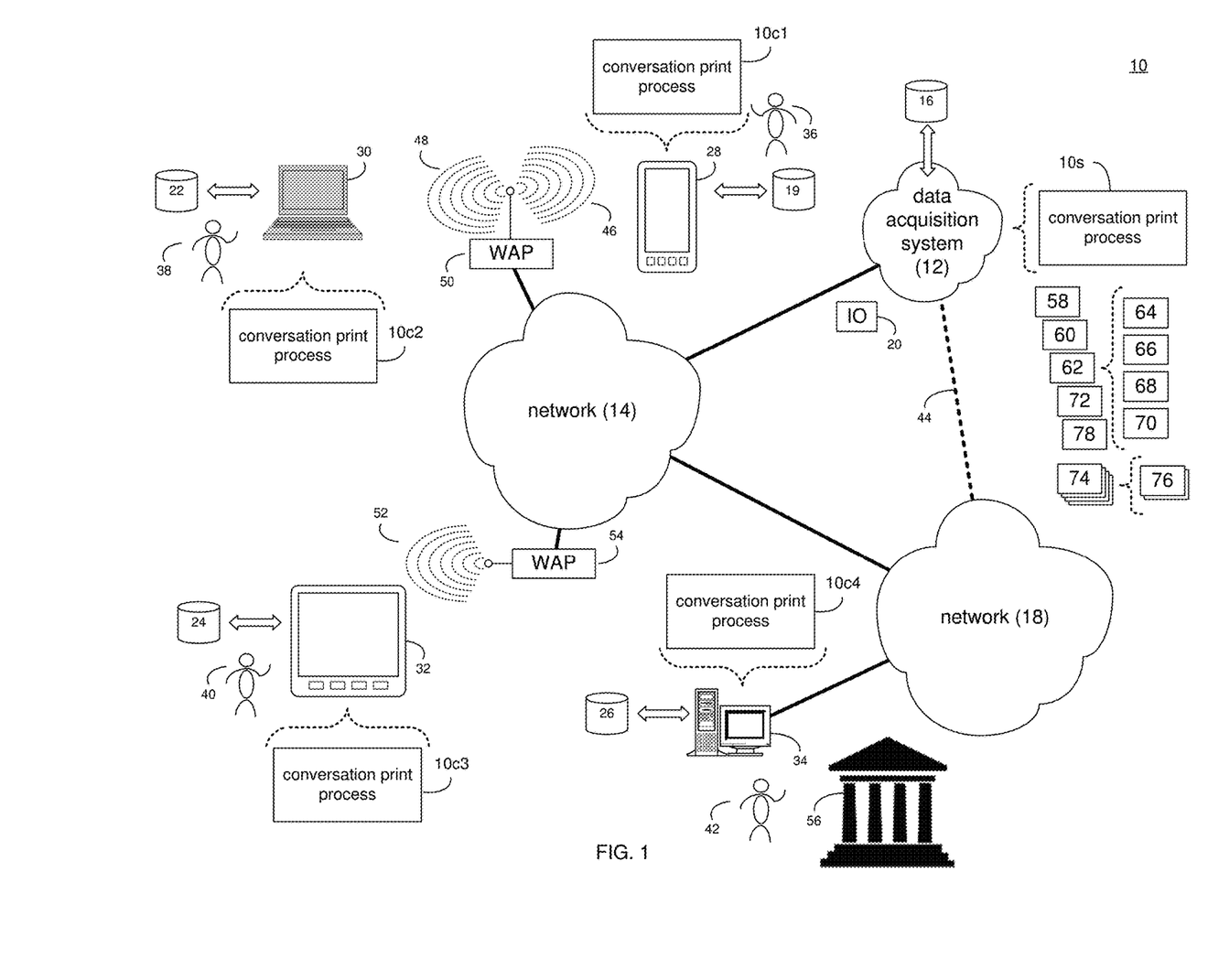
FIG. 1 is a diagrammatic view of a data acquisition system and a conversation print process coupled to a distributed computing network.

Referring to FIG. 1, there is shown conversation print process 10. As will be discussed below in greater detail, conversation print process 10 may be configured to interface with data acquisition system 12 and generate conversation prints that may be utilized to detect and/or frustrate fraudsters.

Conversation print process 10 may be implemented as a server-side process, a client-side process, or a hybrid server-side/client-side process. For example, conversation print process 10 may be implemented as a purely server-side process via conversation print process 10s. Alternatively, conversation print process 10 may be implemented as a purely client-side process via one or more of conversation print process 10c1, conversation print process 10c2, conversation print process 10c3, and conversation print process 10c4. Alternatively still, conversation print process 10 may be implemented as a hybrid server-side/client-side process via conversation print process 10s in combination with one or more of conversation print process 10c1, conversation print process 10c2, conversation print process 10c3, and conversation print process 10c4.

Accordingly, conversation print process 10 as used in this disclosure may include any combination of conversation print process 10s, conversation print process 10c1, conversation print process 10c2, conversation print process 10c3, and conversation print process 10c4.

Conversation print process 10s may be a server application and may reside on and may be executed by data acquisition system 12, which may be connected to network 14 (e.g., the Internet or a local area network). Data acquisition system 12 may include various components, examples of which may include but are not limited to: a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, one or more software applications, one or more software platforms, a cloud-based computational system, and a cloud-based storage platform.

As is known in the art, a SAN may include one or more of a personal computer, a server computer, a series of server computers, a mini computer, a mainframe computer, a RAID device and a NAS system. The various components of data acquisition system 12 may execute one or more operating systems, examples of which may include but are not limited to: Microsoft Windows Server™; Redhat Linux™, Unix, or a custom operating system, for example.

The instruction sets and subroutines of conversation print process 10s, which may be stored on storage device 16 coupled to data acquisition system 12, may be executed by one or more processors (not shown) and one or more memory architectures (not shown) included within data acquisition system 12. Examples of storage device 16 may include but are not limited to: a hard disk drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from conversation print process 10s, conversation print process 10c1, conversation print process 10c2, conversation print process 10c3 and/or conversation print process 10c4 to data acquisition system 12. Examples of IO request 20 may include but are not limited to data write requests (i.e. a request that content be written to data acquisition system 12) and data read requests (i.e. a request that content be read from data acquisition system 12).

The instruction sets and subroutines of conversation print process 10c1, conversation print process 10c2, conversation print process 10c3 and/or conversation print process 10c4, which may be stored on storage devices 19, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 19, 22, 24, 26 may include but are not limited to: hard disk drives; optical drives; RAID devices; random access memories (RAM); read-only memories (ROM), and all forms of flash memory storage devices.

Examples of client electronic devices 28, 30, 32, 34 may include, but are not limited to, data-enabled, cellular telephone 28, laptop computer 30, tablet computer 32, personal computer 34, a notebook computer (not shown), a server computer (not shown), a gaming console (not shown), a smart television (not shown), and a dedicated network device (not shown). Client electronic devices 28, 30, 32, 34 may each execute an operating system, examples of which may include but are not limited to Microsoft Windows™, Android™, WebOS™, iOS™, Redhat Linux™, or a custom operating system.

Users 36, 38, 40, 42 may access analysis process 10 directly through network 14 or through secondary network 18. Further, conversation print process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 46, 48 (respectively) established between data-enabled, cellular telephone 28, laptop computer 30 (respectively) and cellular network/bridge 50, which is shown directly coupled to network 14. Further, personal tablet computer 32 is shown wirelessly coupled to network 14 via wireless communication channel 52 established between tablet computer 32 and wireless access point (i.e., WAP) 54, which is shown directly coupled to network 14. Additionally, personal computer 34 is shown directly coupled to network 18 via a hardwired network connection.

The Data Acquisition System

As will be discussed below in greater detail, data acquisition system 12 may be configured to acquire data that is provided by a third-party (e.g., a customer) to a platform user (e.g., a customer service representative) during an engagement (e.g., a conversation). For example, a customer may call a sales phone line to purchase a product, or a customer, may call a reservation line to book air travel, or a customer may call a customer service line to request assistance concerning a product purchased or a service received.

Assume for the following example that the customer service representative (e.g., user 42) is an employee of credit card company 56 and that the third-party (e.g., user 36) is a customer who contacts credit card company 56 to request assistance concerning a credit/debit card.

Conversation Prints

As discussed above, conversation print process 10 may be configured to interface with data acquisition system 12 and generate conversation prints that may be utilized to detect and/or frustrate fraudsters.

Figure 2:
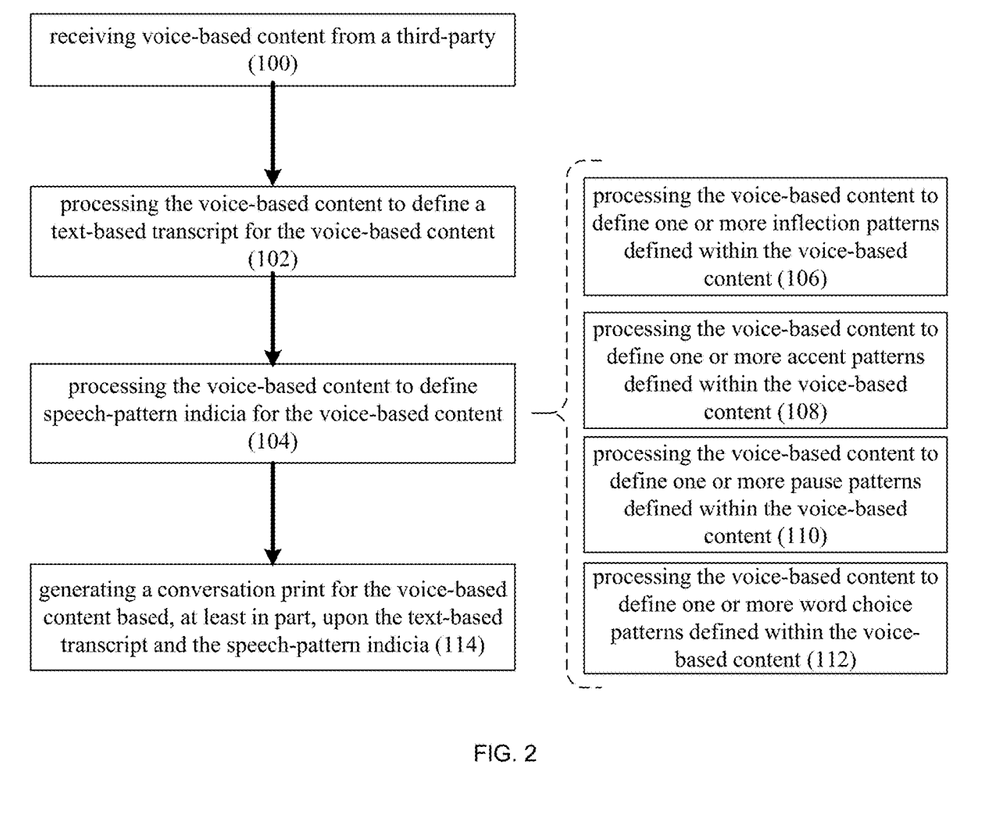
FIG. 2 is a flow chart of one implementation of the conversation print process of FIG. 1.

Referring also to FIG. 2, conversation print process 10 may receive 100 voice-based content (e.g., content 58) from a third-party (e.g., user 36). As discussed above, an example of this third-party (e.g., user 36) may be a customer of (in this example) credit card company 56. For example, assume that whenever a representative of credit card company 56 receives a call, data acquisition system 12 may be activated to capture some or all of voice-based content (e.g., content 58) and conversation print process 10 may be activated to generate conversation prints that may be utilized to detect and/or frustrate fraudsters that contact (in this example) credit card company 56. Accordingly, voice-based content (e.g., content 58) from a third-party (e.g., user 36) may include a portion of a telephone conversation between the third-party (e.g., user 36) and a customer service representative (e.g., user 42). For the following discussion, a fraudster may be a human being (e.g., a person that commits acts of fraud), a computer-based system (e.g., a speech "bot" that follows a script and uses artificial intelligence to respond to questions by the customer service representative), and a hybrid system (e.g., a person that commits acts of fraud but uses a computer-based system to change their voice).

Conversation print process 10 may process 102 the voice-based content (e.g., content 58) to define a text-based transcript for the voice-based content. For example, conversation print process 10 may process 102 the voice-based content (e.g., content 58) to produce text-based transcript (e.g., text-based transcript 60) using e.g., various speech-to-text platforms or applications (e.g., such as those available from Nuance Communications, Inc. of Burlington, Mass.).

Further, conversation print process 10 may process 104 the voice-based content (e.g., content 58) to define speech-pattern indicia (e.g., speech-pattern indicia 62) for the voice-based content (e.g., content 58). When processing 104 the voice-based content (e.g., content 58) to define speech-pattern indicia 62, various features within the voice-based content (e.g., content 58) may be identified.

For example and when processing 104 the voice-based content (e.g., content 58) to define speech-pattern indicia (e.g., speech-pattern indicia 62) for the voice-based content (e.g., content 58), conversation print process 10 may process 106 the voice-based content (e.g., content 58) to define one or more inflection patterns (e.g., inflection patterns 64) defined within the voice-based content.

As is known in the art, an inflection is an aspect of speech in which the speaker modifies the pronunciation of a word to express different grammatical categories (such as tense, case, voice, aspect, person, number, gender, and mood). Specifically, certain people may speak in certain manners wherein they may add specific inflections on e.g., the last words of a sentence. Such inflection patterns (e.g., inflection patterns 64) may be utilized by conversation print process 10 to identify the provider of voice-based content (e.g., content 58).

Additionally and when processing 104 the voice-based content (e.g., content 58) to define speech-pattern indicia (e.g., speech-pattern indicia 62) for the voice-based content (e.g., content 58), conversation print process 10 may process 108 the voice-based content (e.g., content 58) to define one or more accent patterns (e.g., accent patterns 66) defined within the voice-based content (e.g., content 58).

As is known in the art, different people of different ethnic origins may pronounce the same words differently (e.g., a native born American speaking English, versus a person from the United Kingdom speaking English, versus a person from India speaking English). Further, people of common ethic origin may pronounce the same words differently depending upon the particular geographic region in which they are located (e.g., a native-born American from New York City versus a native-born American from Dallas, Tex.). Such accent patterns (e.g., accent patterns 66) may be utilized by conversation print process 10 to identify the provider of voice-based content (e.g., content 58).

Further and when processing 104 the voice-based content to define speech-pattern indicia (e.g., speech-pattern indicia 62) for the voice-based content (e.g., content 58), conversation print process 10 may process 110 the voice-based content (e.g., content 58) to define one or more pause patterns (e.g., pause patterns 68) defined within the voice-based content (e.g., content 58).

As is known in the art, various people speak in various ways. Some people continuously speak without pausing, while other people may introduce a considerable number of pauses into their speech, while others may fill those pauses with filler words (e.g., "ummm", "you know", and "like"). Such pause patterns (e.g., pause patterns 68) may be utilized by conversation print process 10 to identify the provider of voice-based content (e.g., content 58).

Additionally and when processing 104 the voice-based content (e.g., content 58) to define speech-pattern indicia (e.g., speech-pattern indicia 62) for the voice-based content (e.g., content 58), conversation print process 10 may process 112 the voice-based content (e.g., content 58) to define one or more word choice patterns (e.g., word choice patterns 70) defined within the voice-based content (e.g., content 58).

Specifically, certain people tend to frequently use certain words. For example, one person may frequently use "typically" while another person may frequently use "usually". Such word choice patterns (e.g., word choice patterns 70) may be utilized by conversation print process 10 to identify the provider of voice-based content (e.g., content 58).

While four specific examples of speech-pattern indicia (e.g., speech-pattern indicia 62) are described above (namely: inflection patterns 64, accent patterns 66, pause patterns 68, and word choice patterns 70), this is for illustrative purposes only and is not intended to be a limitation of this disclosure, as other configurations are possible and are considered to be within the scope of this disclosure. Accordingly, other examples of such speech-pattern indicia (e.g., speech-pattern indicia 62) may include but are not limited to speech speed, speech cadence, word length, rhythm, etc.

Conversation print process 10 may then generate 114 a conversation print (e.g., conversation print 72) for the voice-based content (e.g., content 58) based, at least in part, upon the text-based transcript (e.g., text-based transcript 60) and the speech-pattern indicia (e.g., speech-pattern indicia 62), which may include one or more of: inflection patterns 64, accent patterns 66, pause patterns 68 and/or word choice patterns 70. The conversation print (e.g., conversation print 72) may be configured to define a conversation pattern for the third-party (e.g., user 36) based upon their engagement with the customer service representative (e.g., user 42). These conversation prints (e.g., conversation print 72) may be stored within and/or accessible by conversation print process 10 and/or data acquisition system 12. According and through the use of such conversation prints (e.g., conversation print 72), the various third-parties may be subsequently identified when they engage in future calls to e.g., credit card company 56.

It is understood that the above-described conversation prints (e.g., conversation print 72) may be periodically updated. For example, a conversation print (e.g., conversation print 72) for a specific user may be modified/updated by conversation print process 10 as e.g., additional interactions with that particular user occur.

While conversation print 72 is discussed above as being based, at least in part, upon the text-based transcript (e.g., text-based transcript 60) and the speech-pattern indicia (e.g., speech-pattern indicia 62), this is for illustrative purposes only and is not intended to be a limitation of this disclosure. For example, conversation print 72 may also include (and/or be based upon) metadata and other features, examples of which may include but are not limited to call purpose, ANI, date/time information, number of calls previously made by the third-party (e.g., user 36), the number of words in the conversation, etc.

Caller Validity

As discussed above, a conversation print (e.g., conversation print 72) may be defined for various third-parties (e.g., user 36), wherein these conversation prints (e.g., conversation print 72) may be stored within and/or accessible by conversation print process 10 and/or data acquisition system 12 so that the various third-parties may be subsequently identified.

Figure 3:
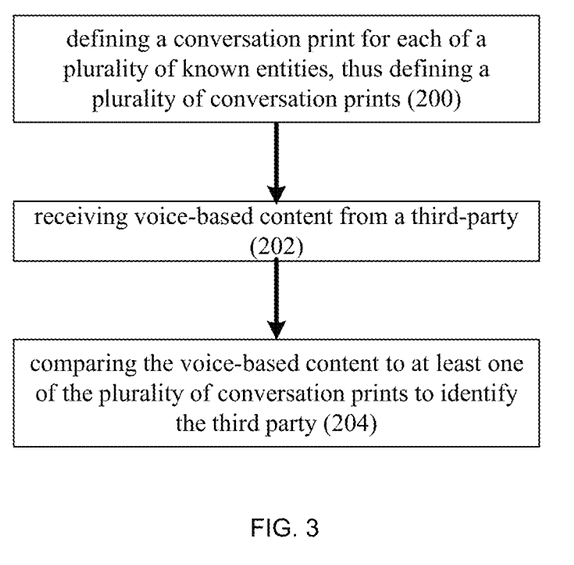
FIG. 3 is a flow chart of another implementation of the conversation print process of FIG. 1.

Referring also to FIG. 3, conversation print process 10 may define 200 a conversation print for each of a plurality of known entities (e.g., user 36, 38, 40), thus defining a plurality of conversation prints (e.g., plurality of conversation prints 74). This plurality of known entities may include at least one authorized user and/or at least one known fraudster. For example, assume that users 36, 38 are authorized users (e.g., customers) of credit card company 56, while user 40 is a fraudster known to credit card company 56. Accordingly, assume that since users 36, 38 are authorized users (e.g., customers) of credit card company 56, users 36, 38 may contact credit card company 56 to e.g., dispute a charge, inquire about available credit, request a replacement credit card, etc. Accordingly, it is foreseeable that fraudsters may contact credit card company 56. Accordingly, assume that user 40 is a known fraudster for which a conversation print was previously made and it was determined that user 40 was e.g., attempting to fraudulently obtain a copy of someone else's credit card.

Assume that when a customer service representative (e.g., user 42) of credit card company 56 receives a call from an unknown third-party, data acquisition system 12 may be activated to capture some or all of voice-based content (e.g., content 58). As discussed above, conversation prints (e.g., plurality of conversation prints 74) may be utilized to detect and/or frustrate fraudsters that contact (in this example) credit card company 56. Accordingly, conversation print process 10 may receive 202 voice-based content (e.g., content 58) from this unknown third-party.

Conversation print process 10 may then compare 204 the voice-based content (e.g., content 58) to at least one of the plurality of conversation prints (e.g., plurality of conversation prints 74) to identify this unknown third party. As discussed above, each conversation print within the plurality of conversation prints 74 may define speech-pattern indicia that includes:

one or more inflection patterns (e.g., inflection patterns 64) defined within the voice-based content (e.g., content 58);

one or more accent patterns (e.g., accent patterns 66) defined within the voice-based content (e.g., content 58);

one or more pause patterns (e.g., pause patterns 68) defined within the voice-based content (e.g., content 58); and/or one more word choice patterns (e.g., word choice patterns 70) defined within the voice-based content (e.g., content 58).

If the unknown third-party is identified when conversation print process 10 compares 204 the voice-based content (e.g., content 58) to the plurality of conversation prints (e.g., plurality of conversation prints 74), the appropriate action may be taken. For example, conversation print process 10 and/or data acquisition system 12 may allow the call to continue between the unknown third-party and the customer service representative (e.g., user 42) of credit card company 56 if the unknown third-party is determined to be an authorized user (e.g., users 36, 38). Alternatively, conversation print process 10 and/or data acquisition system 12 may take remedial action (e.g., terminate the call, notify management, notify the authorities) if the unknown third-party is determined to be a known fraudster (e.g., user 40).

Fraudster Template

Figure 4:
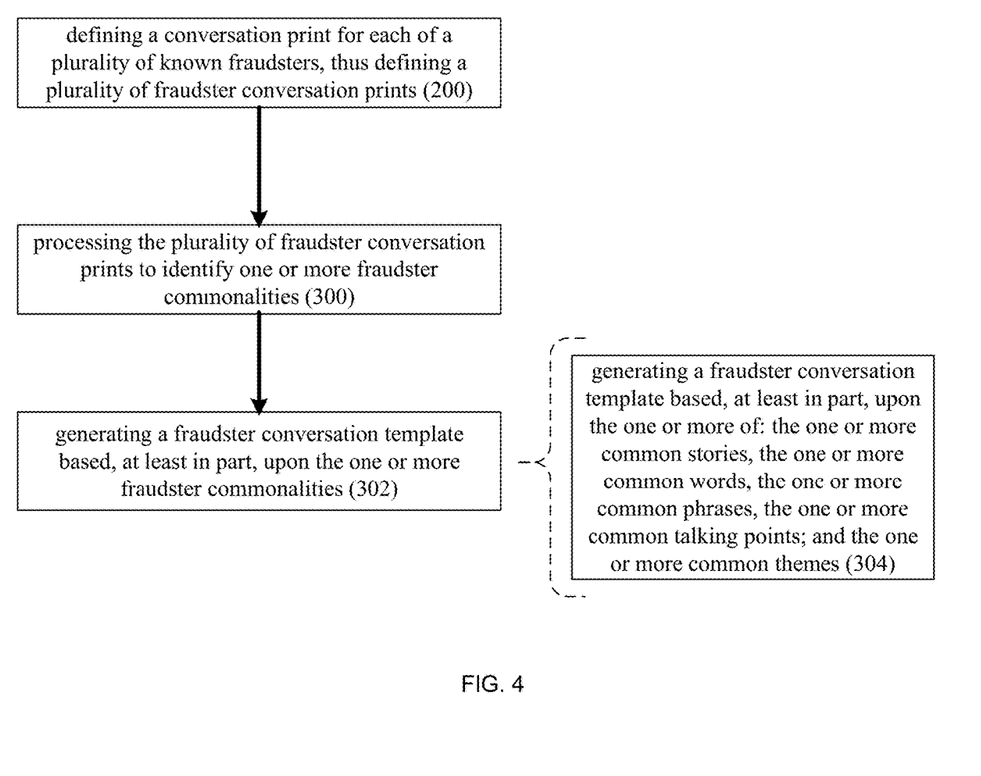
FIG. 4 is a flow chart of another implementation of the conversation print process of FIG. 1.

Referring also to FIG. 4 and as discussed above, conversation print process 10 may define 200 a conversation print for each of a plurality of known entities (e.g., user 36, 38, 40), thus defining a plurality of conversation prints (e.g., plurality of conversation prints 74). Assume for this example that plurality of conversation prints 74 includes a plurality of conversation prints for known fraudsters (e.g., fraudster conversation prints 76).

As discussed above, each conversation print within the plurality of conversation prints 74 may define speech-pattern indicia that includes:

one or more inflection patterns (e.g., inflection patterns 64) defined within the voice-based content (e.g., content 58);

one or more accent patterns (e.g., accent patterns 66) defined within the voice-based content (e.g., content 58);

one or more pause patterns (e.g., pause patterns 68) defined within the voice-based content (e.g., content 58); and/or one more word choice patterns (e.g., word choice patterns 70) defined within the voice-based content (e.g., content 58).

Accordingly, conversation print process 10 may process 300 the plurality of fraudster conversation prints (e.g., fraudster conversation prints 76) to identify one or more fraudster commonalities. Examples of these one or more fraudster commonalities may include but are not limited to one or more of:

one or more common stories;
one or more common words;
one or more common phrases;
one or more common talking points; and
one or more common themes.

Common Stories: Often, when a fraudster engages a company (e.g., credit card company 56) to commit an act of fraud, these fraudsters often act in groups (e.g., on teams) and work off of a script that tells a common story concerning e.g., being on vacation in a foreign country and having their wallet stolen so now they are stranded and need a copy of their credit card immediately.

Common Words: Since these fraudsters often act in groups (e.g., on teams) and work off of a script that tells a common story, these common stories may include but are not limited to common words (e.g., "mugged", "stranded" and/or "desperate").

Common Phrases: Again, since these fraudsters often act in groups (e.g., on teams) and work off of a script that tells a common story, these common stories may include but are not limited to common phrases (e.g., "Cozumel, Mexico", "wife and kids", "no food", "no hotel", "no car" and/or "need help immediately").

Common Talking Points: The use of such scripts by these fraudsters may result in the common talking points being spoken by these fraudsters, wherein examples of these common talking points may include but are not limited to: being stranded, being in danger, being with kids and/or being in a foreign country.

Common Themes: Additionally, the use of such scripts by these fraudsters may result in the common talking points being spoken by these fraudsters, wherein examples of these common talking points may include but are not limited to: being mugged, being followed out of a bar, being drugged, having lost a wallet/purse and/or having a hotel room robbed.

Once conversation print process 10 processes 300 the plurality of fraudster conversation prints (e.g., fraudster conversation prints 76) and identifies one or more fraudster commonalities, conversation print process 10 may generate 302 a fraudster conversation template (e.g., fraudster conversation template 78) based, at least in part, upon the one or more fraudster commonalities (e.g., one or more common stories; one or more common words; one or more common phrases; one or more common talking points; and one or more common themes).

When generating 302 a fraudster conversation template (e.g., fraudster conversation template 78) based, at least in part, upon the one or more fraudster commonalities, conversation print process 10 may generate 304 a fraudster conversation template (e.g., fraudster conversation template 78) based, at least in part, upon the one or more of: the one or more common stories, the one or more common words, the one or more common phrases, the one or more common talking points; and the one or more common themes.

Accordingly and in the event that a new caller subsequently contacts (in this example) credit card company 56, the voice-based content provided by the new caller may be compared to fraudster conversation template 78 to determine whether or not the new caller is a fraudster (even though the new caller never called credit card company 56 before and, therefore, there is no conversation print on file for the new caller).

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
    receiving voice-based content from a third-party;
    processing the voice-based content to define a text-based transcript for the voice-based content;
    processing the voice-based content to define speech-pattern indicia for the voice-based content, wherein processing the voice-based content to define speech-pattern indicia for the voice-based content includes processing the voice-based content to define one or more pause patterns, speech speed patterns, word character length patterns, and filler word patterns of the one or more pause patterns defined within the voice-based content; and
    generating a conversation print for the voice-based content based, at least in part, upon the text-based transcript and the speech-pattern indicia, wherein the conversation print is generated using a conversation pattern for the third-party based upon, at least in part, frequency of only a single word chosen and used by the third-party over a similar single word chosen and used by another person, and wherein the conversation pattern for the third-party is further based upon, at least in part, one or more inflection patterns defined within the voice-based content to define the conversational pattern, wherein the one or more inflection patterns include a location of one or more inflections in one or more sentences, wherein the conversation pattern for the third-party is further based upon, at least in part, the speech speed patterns, the one or more pause patterns, the word character length patterns, and the filler word patterns of the one or more pause patterns of the voice-based content from the third party;
    determining if a subsequent call includes a fraudster based upon the conversation print;
    continuing the subsequent call if the subsequent call does not include the fraudster; and
    taking remedial action if the subsequent call does include the fraudster, wherein remedial action includes at least one of terminating the subsequent call and providing a notification that the subsequent call does include the fraudster.

2. The computer-implemented method of claim 1 wherein processing the voice-based content to define speech-pattern indicia for the voice-based content includes:
    processing the voice-based content to define one or more accent patterns defined within the voice-based content.

3. The computer-implemented method of claim 1 wherein processing the voice-based content to define speech-pattern indicia for the voice-based content includes:
    processing the voice-based content to define one or more word choice patterns defined within the voice-based content.

4. The computer-implemented method of claim 1 wherein the voice-based content from a third-party includes:
a portion of a telephone conversation between the third-party and a customer service representative.

5. A computer program product residing on a non-transitory computer readable medium having a plurality of instructions stored thereon which, when executed by a processor, cause the processor to perform operations comprising:
receiving voice-based content from a third-party;
processing the voice-based content to define a text-based transcript for the voice-based content;
processing the voice-based content to define speech-pattern indicia for the voice-based content, wherein processing the voice-based content to define speech-pattern indicia for the voice-based content includes processing the voice-based content to define one or more pause patterns, speech speed patterns, word character length patterns, and filler word patterns of the one or more pause patterns defined within the voice-based content; and
generating a conversation print for the voice-based content based, at least in part, upon the text-based transcript and the speech-pattern indicia, wherein the conversation print is generated using a conversation pattern for the third-party based upon, at least in part, frequency of only a single word chosen and used by the third-party over a similar single word chosen and used by another person, and wherein the conversation pattern for the third-party is further based upon, at least in part, one or more inflection patterns defined within the voice-based content to define the conversational pattern, wherein the one or more inflection patterns include a location of one or more inflections in one or more sentences, wherein the conversation pattern for the third-party is further based upon, at least in part, the speech speed patterns, the one or more pause patterns, the word character length patterns, and the filler word patterns of the one or more pause patterns of the voice-based content from the third party;
determining if a subsequent call includes a fraudster based upon the conversation print;
continuing the subsequent call if the subsequent call does not include the fraudster; and
taking remedial action if the subsequent call does include the fraudster, wherein remedial action includes at least one of terminating the subsequent call and providing a notification that the subsequent call does include the fraudster.

6. The computer program product of claim 5 wherein processing the voice-based content to define speech-pattern indicia for the voice-based content includes:
processing the voice-based content to define one or more accent patterns defined within the voice-based content.

7. The computer program product of claim 5 wherein processing the voice-based content to define speech-pattern indicia for the voice-based content includes:
processing the voice-based content to define one or more word choice patterns defined within the voice-based content.

8. The computer program product of claim 5 wherein the voice-based content from a third-party includes:
a portion of a telephone conversation between the third-party and a customer service representative.

9. A computing system including a processor and memory configured to perform operations comprising:
receiving voice-based content from a third-party;
processing the voice-based content to define a text-based transcript for the voice-based content;
processing the voice-based content to define speech-pattern indicia for the voice-based content, wherein processing the voice-based content to define speech-pattern indicia for the voice-based content includes processing the voice-based content to define one or more pause patterns, speech speed patterns, word character length patterns, and filler word patterns of the one or more pause patterns defined within the voice-based content; and
generating a conversation print for the voice-based content based, at least in part, upon the text-based transcript and the speech-pattern indicia, wherein the conversation print is generated using a conversation pattern for the third-party based upon, at least in part, frequency of only a single word chosen and used by the third-party over a similar single word chosen and used by another person, and wherein the conversation pattern for the third-party is further based upon, at least in part, one or more inflection patterns defined within the voice-based content to define the conversational pattern, wherein the one or more inflection patterns include a location of one or more inflections in one or more sentences, wherein the conversation pattern for the third-party is further based upon, at least in part, the speech speed patterns, the one or more pause patterns, the word character length patterns, and the filler word patterns of the one or more pause patterns of the voice-based content from the third party;
determining if a subsequent call includes a fraudster based upon the conversation print;
continuing the subsequent call if the subsequent call does not include the fraudster; and
taking remedial action if the subsequent call does include the fraudster, wherein remedial action includes at least one of terminating the subsequent call and providing a notification that the subsequent call does include the fraudster.

10. The computing system of claim 9 wherein processing the voice-based content to define speech-pattern indicia for the voice-based content includes:
processing the voice-based content to define one or more accent patterns defined within the voice-based content.

11. The computing system of claim 9 wherein processing the voice-based content to define speech-pattern indicia for the voice-based content includes:
processing the voice-based content to define one or more word choice patterns defined within the voice-based content.

12. The computing system of claim 9 wherein the voice-based content from a third-party includes:
a portion of a telephone conversation between the third-party and a customer service representative.

* * * * *